(12) United States Patent
Aoki

(10) Patent No.: US 6,838,688 B2
(45) Date of Patent: Jan. 4, 2005

(54) LIGHT SPOT POSITION SENSOR AND DISPLACEMENT MEASURING DEVICE

(75) Inventor: Toshihiko Aoki, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 98 days.

(21) Appl. No.: 09/899,911

(22) Filed: Jul. 9, 2001

(65) Prior Publication Data

US 2002/0021450 A1 Feb. 21, 2002

(30) Foreign Application Priority Data

Jul. 10, 2000 (JP) .......................... 2000-207981
Apr. 6, 2001 (JP) .......................... 2001-108185

(51) Int. Cl.[7] .......................... G01N 21/86; G01V 8/00
(52) U.S. Cl. .......................... 250/559.29; 250/237 G; 250/231.14
(58) Field of Search .......................... 250/559.29, 237 R, 250/237 G, 214.1, 559.22, 231.13, 231.14, 231.16, 231.18; 257/443, 446, E27.153; 438/75; 356/614, 616

(56) References Cited

U.S. PATENT DOCUMENTS 4,409,479 A  * 10/1983 Sprague et al. ......... 250/237 G
4,521,106 A    6/1985 Lambeth
4,708,483 A   11/1987 Lorenz
4,911,551 A    3/1990 Morander
5,547,879 A    8/1996 Dierschke et al.
5,671,052 A  *  9/1997 Kawakubo et al. ......... 356/616

FOREIGN PATENT DOCUMENTS

JP       A 2000-346615       12/2000
JP         2001-50778 A    *  2/2001

* cited by examiner

Primary Examiner—Thanh X. Luu
Assistant Examiner—Seung C. Sohn
(74) Attorney, Agent, or Firm—Oliff & Berridge, PLC

(57) ABSTRACT

There is provided a displacement measuring device of which assembled state can be determined optically with ease. There is also provided a light spot position sensor usefully applicable in determination of the assembled state of the displacement measuring device. An optical encoder comprises a scale and a sensor head that is arranged opposite to the scale and can move relative to the scale. The sensor head includes a sensor substrate, on which an index grating and a photosensitive device array are formed. The sensor substrate is also employed to mount a light spot position sensor and a light source for providing a light beam entering the light spot position sensor via the scale to configure a state detection system for detecting an assembled state.

8 Claims, 14 Drawing Sheets

STATE DETECTOR

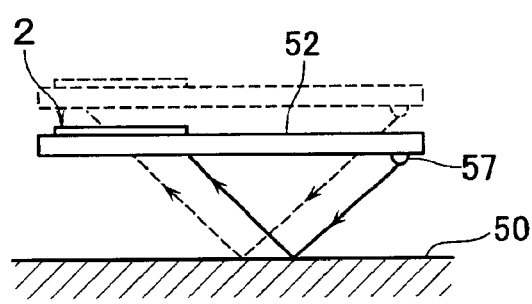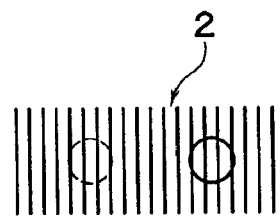
FIG. 15A    FIG. 15B
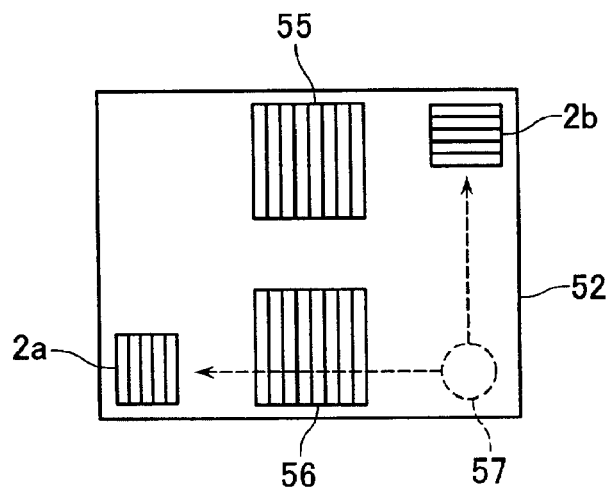
FIG. 16

LIGHT SPOT POSITION SENSOR AND DISPLACEMENT MEASURING DEVICE

BACKGROUND OF THE INVENTION

1. Field of the Invention

The present invention relates to a sensor for detecting a light spot position and to a displacement measuring device using the sensor.

2. Description of the Related Art

A sensor for detecting an incident position of a light spot can be configured using an existing image sensor such a CCD. Such a light spot position sensor is arranged on one of two members together with a light source for providing a light beam. The light beam output from the light source is reflected at the other of the two members and enters the light spot position sensor. It is theoretically possible to use an incident position of the light beam at this moment to detect a tilt or gap between the two members.

There is no actual example of a displacement measuring device that incorporates the above existing CCD. When CCD is incorporated into an encoder part of a small displacement measuring device, a restriction on size causes several disadvantages. For example, the displacement measuring device can not be down sized, shaped arbitrarily and sized to an arbitrary photosensitive pixel. In addition, it elevates the cost and is affected from an actual precision.

SUMMARY OF THE INVENTION

The present invention has been made in consideration of the above disadvantages and accordingly has an object to provide a light spot position sensor with no restriction on size. In addition, the light spot position sensor is possible to have an arbitrary shape and photosensitive pixel size. Further, it can detect a light spot position precisely and reduce the cost.

The present invention has another object to provide a displacement measuring device suitable for the use of such the light spot position sensor incorporated therein.

A light spot position sensor according to the present invention comprises a substrate, and a plurality of photosensitive devices arrayed at a certain pitch, formed with semiconductor layers deposited on the substrate, and isolated from each other.

In the present invention, if the light spot position sensor is for detecting a position in one dimension, the plurality of photosensitive devices includes a photosensitive device array arranged one-dimensionally. If the light spot position sensor is for detecting a position in two dimensions, the plurality of photosensitive devices includes a first photosensitive device array arranged on the substrate along a first axis, and a second photosensitive device array arranged on the first photosensitive device array with an interlayer insulator therebetween, along a second axis different from the first axis.

A displacement measuring device according to the present invention comprises a scale having scale markings formed along a measurement axis; a sensor head movably arranged relative to the scale along the measurement axis for reading the scale markings; and a state detection system mounted on the sensor head for optically detecting a relative positional state of the sensor head to the scale.

Preferably, the state detection system arranges the light spot position sensor on the sensor head and further includes a light source on the sensor head for providing a light beam entering the light spot position sensor via the scale.

To detect the position of the light spot in one- or two-dimensions, a CCD image sensor or a MOS image sensor is applicable as such. These sensors comprise photodiodes arrayed and formed on a substrate of single crystal silicon along with CCD or MOS switches for transferring outputs from the photodiodes to read out. The position in one dimension can be detected only with one line CCD.

These existing CCD and MOS sensors have too complicated structures and manufacturing processes and high prices to be employed in position detection of the light spot. The light spot position sensor according to the present invention employs semiconductor layers deposited on an appropriate substrate to form an array of photosensitive devices isolated from each other. Therefore, it has a simple structure and manufacturing process and can be formed in an arbitrary shape and size. When a state detection system using such the light spot position sensor is incorporated into the displacement measuring device, an assembled state of the sensor head and the scale can be easily determined.

Another displacement measuring device according to the present invention comprises a cantilever arranged opposite to a work to be measured and movable along a surface of the work without contacting the work; the above-described light spot position sensor mounted on the tip of the cantilever; and a light source mounted on the tip of the cantilever for providing a light beam entering the light spot position sensor via the work.

Preferably, the displacement measuring device may also comprise a detector for detecting a surface feature of the work based on a position of the light beam detected at the light spot position sensor, the light beam output from the light source and entering the light spot position sensor via the work.

Preferably, the displacement measuring device may further comprise a displacement device arranged on the cantilever for displacing the tip of the cantilever in the direction opposite to the work; a displacement controller for feedback controlling the displacement device so that a position of the light beam detected at the light spot position sensor always comes to a constant position, the light beam output from the light source and entering the light spot position sensor via the work; and a detector for detecting a surface feature of the work based on a feedback signal from the displacement controller to the displacement device.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which:

FIGS. 15A and 15B illustrate the principle of gap detection by the position sensor;

FIG. 16 shows an arrangement of an index substrate in an optical encoder according to a further embodiment;

DETAILED DESCRIPTION OF THE PREFERRED EMBODIMENTS

Figure 1:
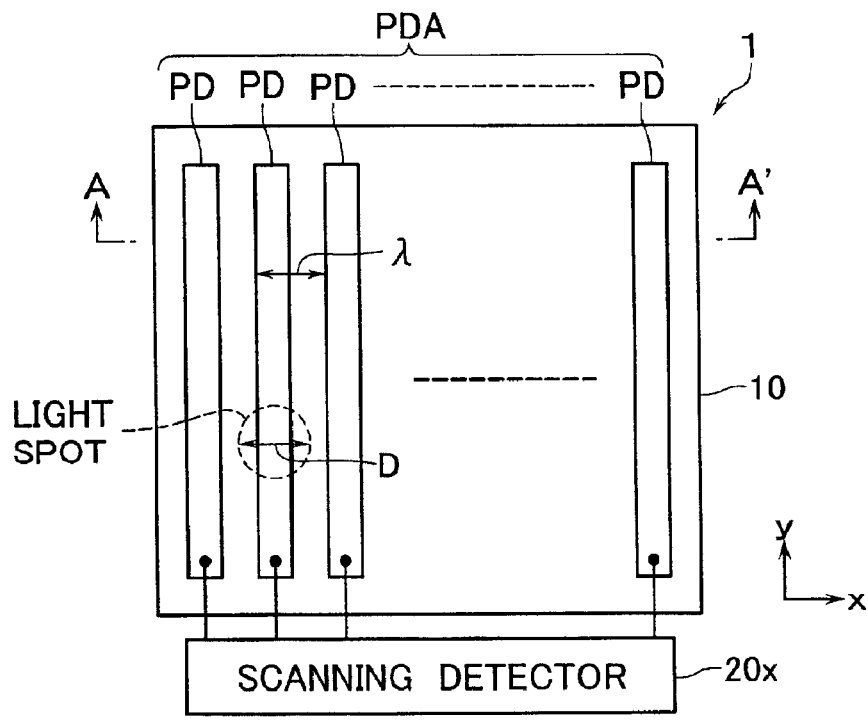
FIG. 1 is a plan view showing an arrangement of a light spot position sensor according to an embodiment of the present invention.
Figure 2:
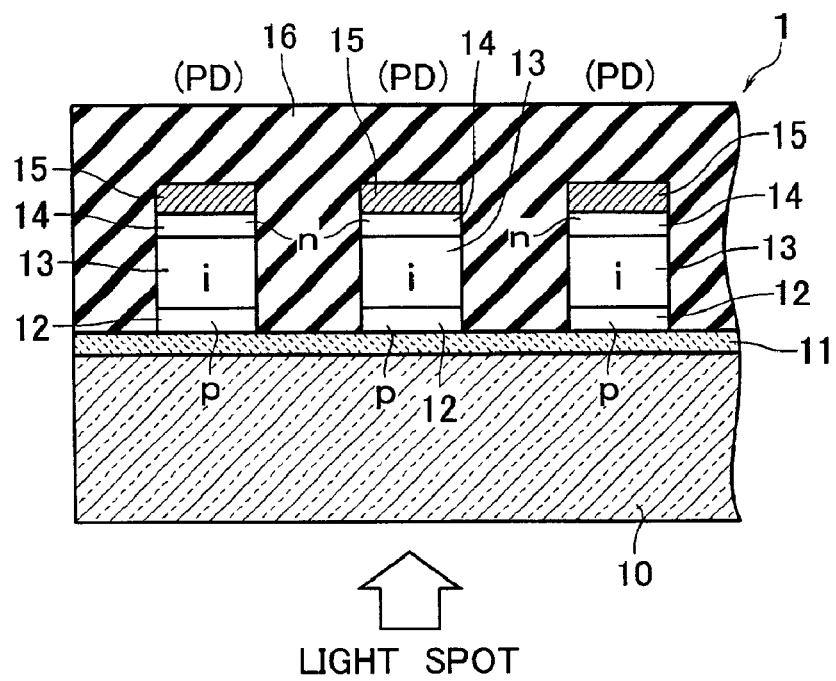
FIG. 2 is a cross-sectional view taken along an A–A' line in FIG. 1.

FIG. 1 is a plan view showing an arrangement of a one-dimensional light spot position sensor 1 for detecting a light spot position and FIG. 2 is a cross-sectional view thereof taken along an A–A' line. The light spot position sensor 1 comprises a photosensitive device array PDA that includes photosensitive devices (photodiodes) PD shaped in stripes, arrayed along the x-axis and formed on a substrate 10.

The substrate 10 in this embodiment is a transparent substrate such as a glass substrate. A common lower electrode or transparent electrode 11 is formed on the substrate 10. On the transparent electrode 11, amorphous semiconductor layers of p-type 12, i-type 13 and n-type 14 and an upper electrode 15 are deposited in turn. These stacked layers are then patterned to isolate photodiodes PD from each other and array at a certain pitch. A passivation film 16 is formed to cover the photosensitive device array PDA.

The transparent electrode 11 is selected from ITO, $SnO_2$, ZnO and the like. A typical amorphous semiconductor is Si but other materials such as CdS and ZnS may also be employed. The photodiode may have a p-n structure other than the p-i-n structure.

In the position sensor 1, as shown in FIGS. 1 and 2, a light spot enters into the rear surface of the substrate 10. An incident position of the light spot in the x-axis direction can be determined by detecting which of photosensitive devices in the photosensitive device array PDA provides an output. This position can be detected when a scanning detector 20x scans each of terminals of the photosensitive devices PD in turn to detect the presence/absence of a photosensitive output.

A resolution on position detection of the light spot is determined from an array pitch in the photosensitive device array PDA. When a light spot to be measured has a diameter of D, the photosensitive device array PDA should have a device array pitch of $\lambda$, which satisfies at least $\lambda/2 \leq D$, preferably $\lambda \leq D$. If the diameter D is too large, the position can be hardly detected. Even in such the case, however, by capturing output signals from plural photosensitive devices as a two-dimensional profile and applying it in a Gaussian distribution, the center of the light spot position can be specified from the Gaussian distribution. Besides the application of the Gaussian distribution for interpolation, application of a sinc function ($\sin\pi x/\pi x$) and application of a free curved surface such as a spline curve and a Bezier curve for interpolation can specify the center of the light spot position more precisely.

Figure 3:
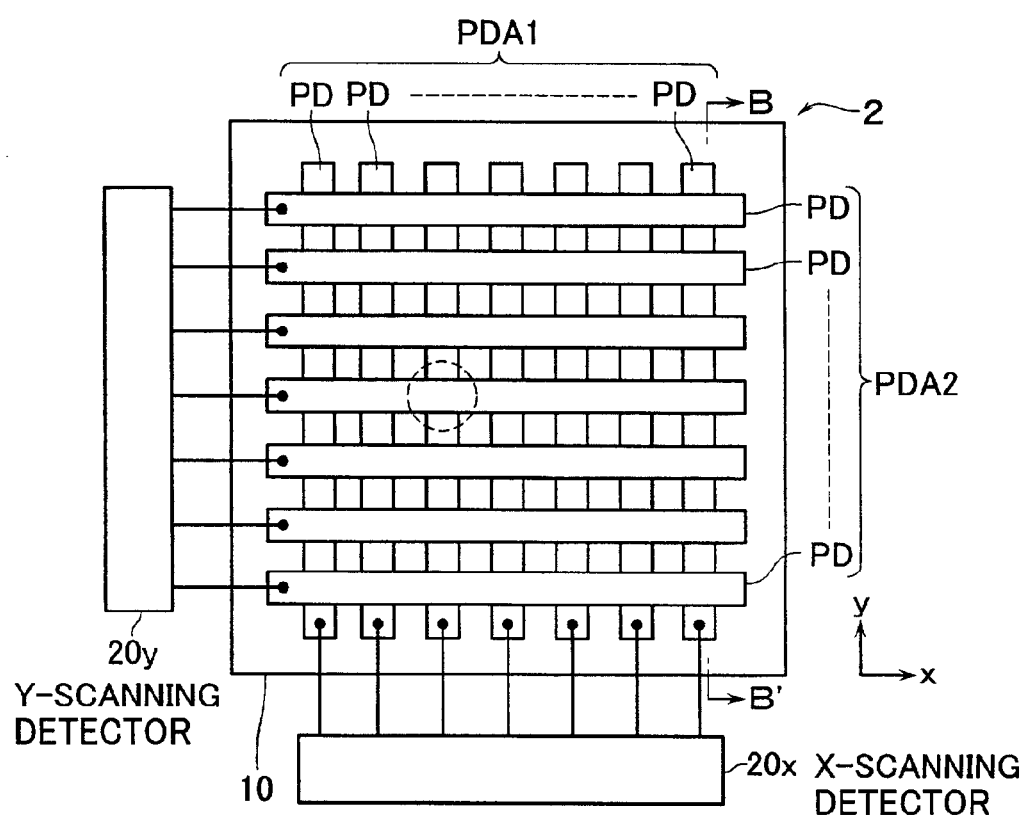
FIG. 3 is a plan view showing an arrangement of a light spot position sensor according to another embodiment of the present invention.
Figure 4:
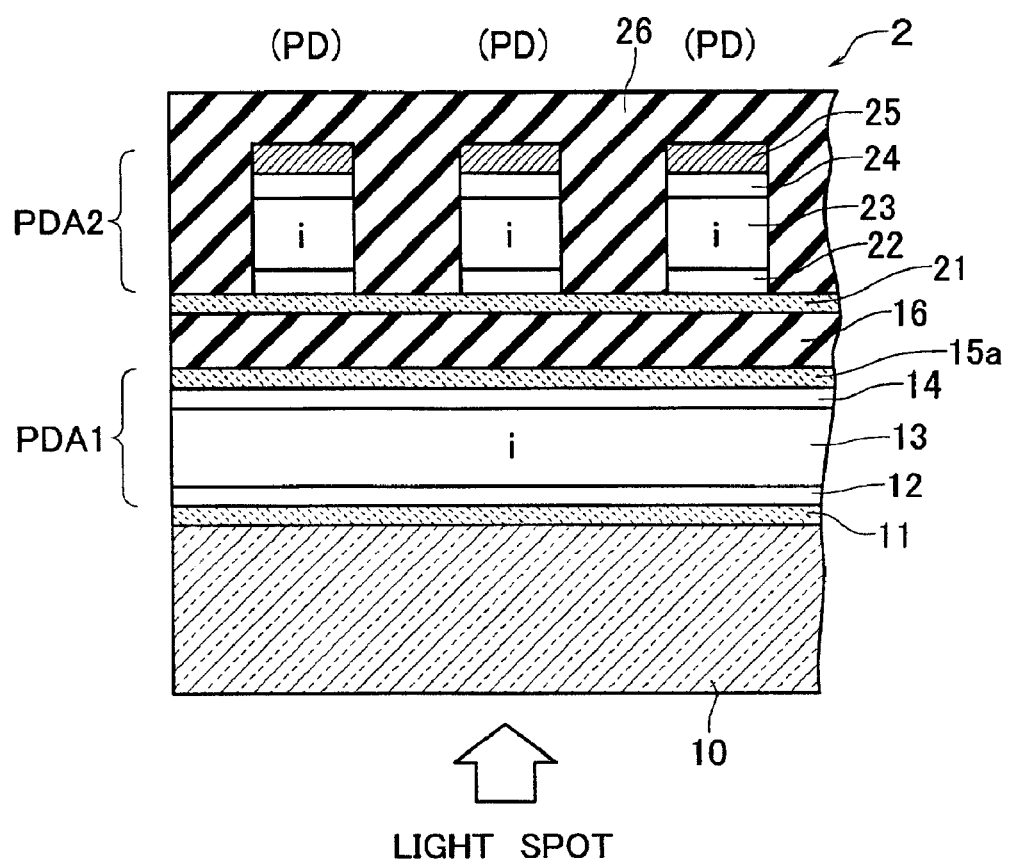
FIG. 4 is a cross-sectional view taken along a B–B' line in FIG. 3.

FIG. 3 is a plan view showing an arrangement of a two-dimensional light spot position sensor 2 and FIG. 4 is a cross-sectional view thereof taken along a B–B' line. This light spot position sensor 2 comprises two photosensitive device arrays PDA1 and PDA2 layered on a substrate 10. The first photosensitive device array PDA1 includes photosensitive devices PD shaped in stripes and arrayed along the x-axis as same as described in FIGS. 1 and 2. In this case, an upper electrode 15a on each photosensitive device PD consists of a transparent electrode. The second photosensitive device array PDA2 includes photosensitive devices PD shaped also in stripes, overlapped on the first photosensitive device array PDA1 via an interlayer insulator 16 and arrayed along the y-axis at a certain pitch.

In the second photosensitive device array PDA2, on a common lower electrode 21 consisting of a transparent electrode, amorphous semiconductor layers of p-type 22, i-type 23 and n-type 24 and an upper electrode 25 are deposited in turn. These stacked layers are then patterned to isolate photodiodes PD from each other. A passivation film 26 is formed to cover the entire.

In this two-dimensional position sensor 2, a light spot enters into the rear surface of the substrate 10. The two-dimensional position of the light spot can be detected using a scanning detector 20x for scanning outputs from the first photosensitive device array PDA1 and a scanning detector 20y for scanning outputs from the second photosensitive device array PDA2.

Figure 5:
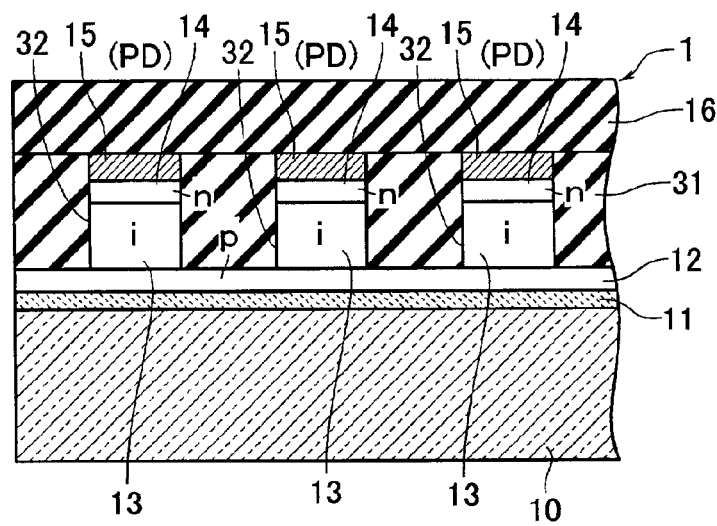
FIG. 5 is a cross-sectional view of a light spot position sensor according to a further embodiment.

FIG. 5 shows another structural example of the position sensor 1 corresponding to FIG. 2. In this structure, each of photosensitive devices PD is buried in a trench formed in an insulator film. Namely, a transparent electrode 11 and a p-type amorphous semiconductor layer 12 are formed over a substrate 10 and an insulator film 31 is deposited thereon. Trenches 32 shaped in stripes are formed by etching in the insulator film 31 at a certain pitch. Then, amorphous semiconductor layers of i-type 13 and n-type 14 and an upper electrode 15 are buried in turn into the trenches 32 to form a photosensitive device array PDA.

Figure 6:
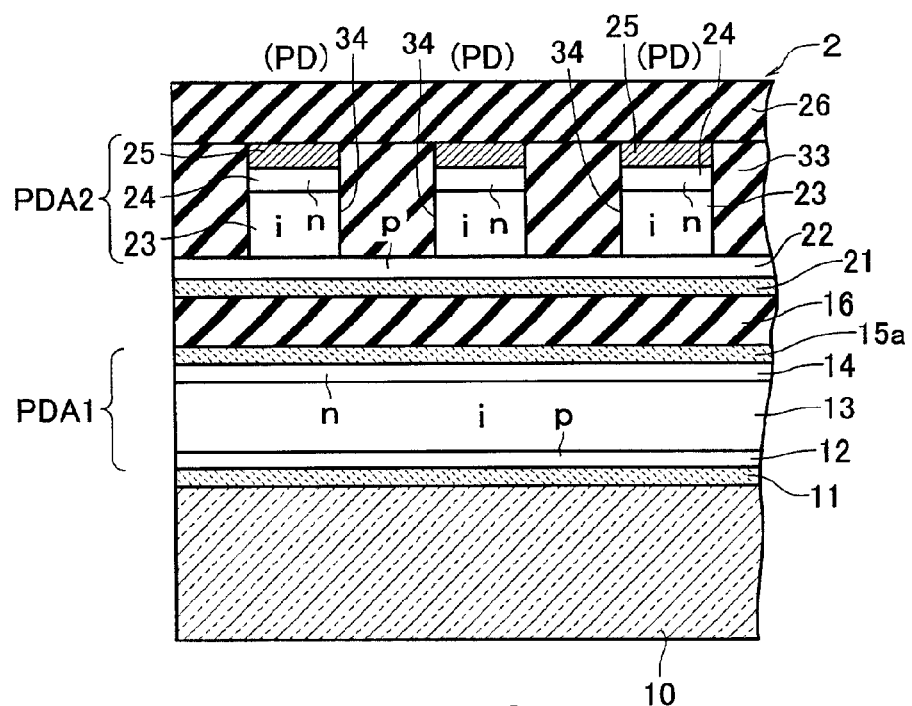
FIG. 6 is a cross-sectional view of a light spot position sensor according to a further embodiment.

This buried structure is similarly applicable to the two-dimensional position sensor 2. FIG. 6 shows such a structural example corresponding to FIG. 4. A first photosensitive device array PDA1 is formed by burying photosensitive devices into trenches formed in an insulator film same as described in FIG. 5. A passivation film 16 is formed to cover the first photosensitive device array PDA1. On the passivation film 16, a transparent electrode or common lower electrode 21 and a p-type amorphous semiconductor layer 22 are formed in turn and an insulator film 33 is deposited thereon. The insulator film 33 is then etched to form trenches 34 shaped in stripes. Then, amorphous semiconductor layers of i-type 23 and n-type 24 and an upper electrode 25 are buried in turn into the trenches 34 to form a second photosensitive device array PDA2.

In the above embodiments, the substrate 10 is transparent and the surface of the substrate 10 opposite to the surface for forming the photosensitive device array thereon is employed as the incident surface of the light spot. To the contrary, if the upper electrode on each photosensitive device can be transparent, the incident surface of the light spot may be set on the upper electrode. In this case, the substrate is not required to be transparent. In addition, the substrate 10 may employ a flexible resin substrate.

Figure 7:
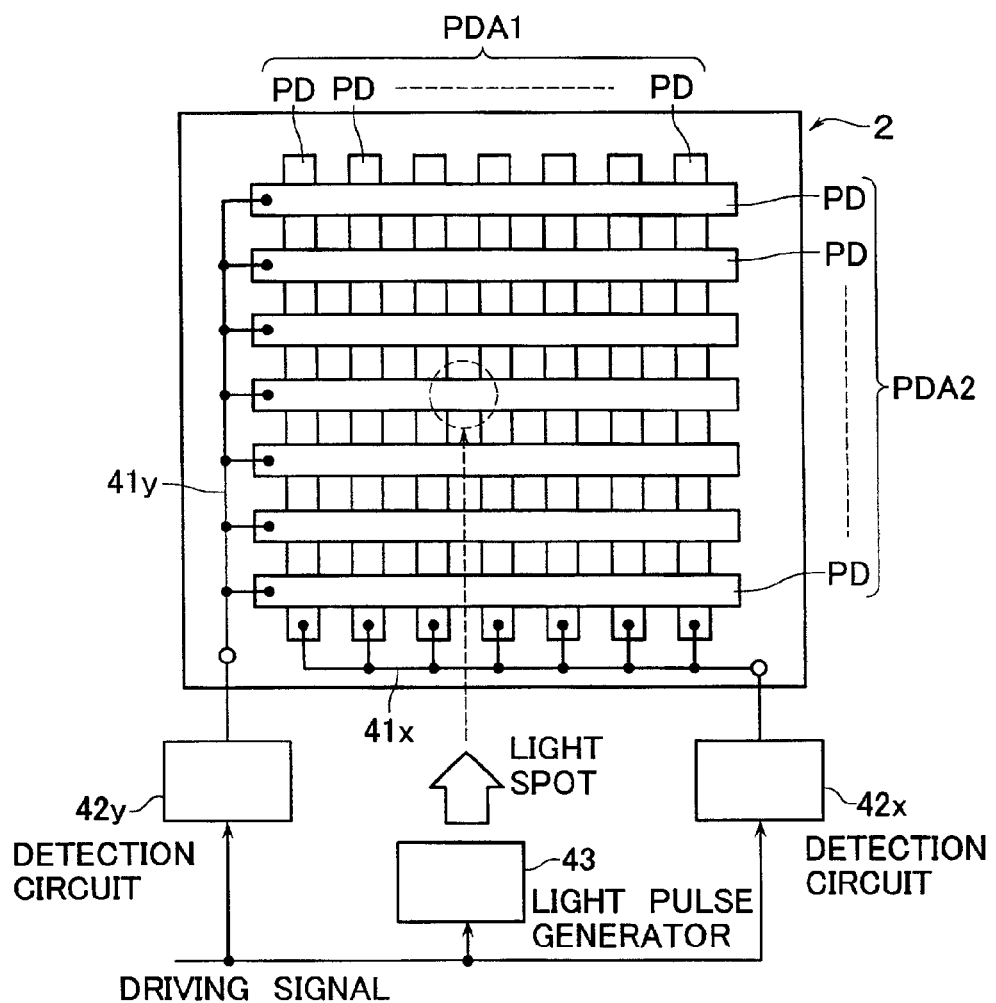
FIG. 7 shows a position detection method by a position sensor according to a further embodiment.

FIG. 7 shows an example of the two-dimensional position sensor 2 to which another position detection method is applied. In this embodiment, photosensitive device arrays PDA1 and PDA2 have terminal electrodes, which are commonly connected to respective output signal lines 41x and 41y. Detection circuits 42x and 42y are respectively connected to the output signal lines 41x and 41y. A light spot is generated in the form of a light pulse from a light pulse generator 43 in response to a driving pulse signal. The driving pulse signal is also supplied as references to the detection circuits 42x and 42y.

Figure 8:
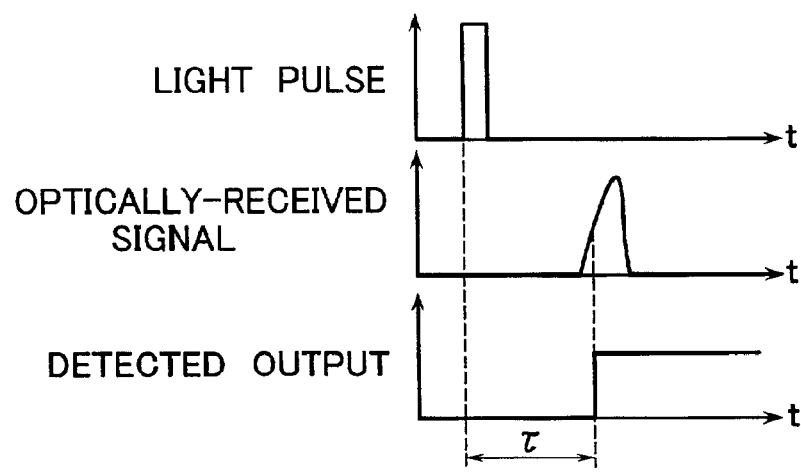
FIG. 8 shows waveforms for illustrating the principle of the position detection according to the same embodiment.

The detection circuits 42x and 42y detect a photo-received signal appeared on the output signal lines 41x and 41y. The detection circuits 42x and 42y also detect a time delay τ when an output is detected after the light pulse is generated as shown in FIG. 8. The terminal electrodes of the plurality of photosensitive devices in each axial direction are connected to the common output signal lines 41x and 41y. Therefore, the farther a position apart from the detection circuits 42x and 42y, the larger the time delay τ. Accordingly, it is possible by detecting the time delay τ to determine which position in the x and y axial directions the light spot impinges on.

The above light spot position sensor may be employed in a state detection system for detecting an assembled state of a scale and sensor head in a displacement measuring device. An example is described next. A known displacement measuring device comprises a scale having scale markings along a measurement axis formed thereon and a sensor head arranged movably along the measurement axis relative to the scale for reading the scale markings. Such the displacement measuring device may have an optical, static or magnetic fundamental configuration.

Performance of the displacement measuring device can be affected from the assembled state of the scale and sensor head. In particular, a small displacement measuring device, its characteristic can be greatly affected from even a slight deflection in attitude of the sensor head and a slight deviation from a design value of a gap between the sensor head and the scale. Therefore, an alignment adjustment is important during the displacement measuring device is assembled. In addition, it is also important to suppress the attitude deflection after assembling. For these purposes, various structural devises have been developed in the art. Conventional displacement measuring devices, however, do not include a function for determining its assembled state easily.

The displacement measuring device herein exemplified is an optical encoder but is not limited to this example. Rather, it is also applicable to a static or magnetic encoder.

Figure 9:
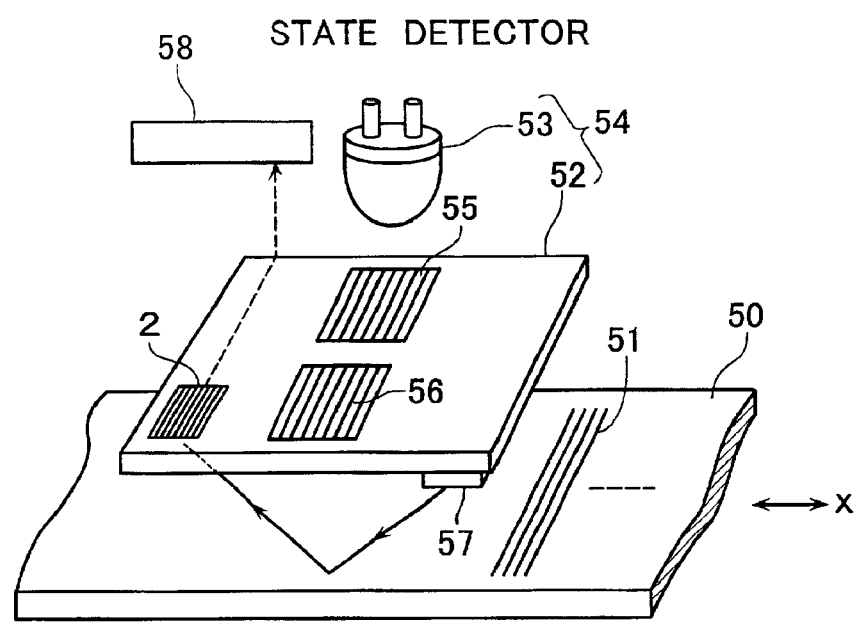
FIG. 9 shows an arrangement of an optical encoder according to a further embodiment of the present invention.

FIG. 9 shows an arrangement of an optical encoder. This optical encoder comprises a scale 50 and a sensor head 54 movably arranged relative thereto, opposing to the scale. The scale 50 in this embodiment is of reflective type and has scale markings or optical gratings 51 formed along a measurement axis x on a scale substrate. The sensor head 54 includes a sensor substrate 52 and a light source 53. On the sensor substrate 52, index gratings 55 for modulating a light emitted from the light source and advancing to the scale 50 and a photosensitive device array 56 for detecting a light from the scale 50.

The light spot position sensor 2 as previously described in FIGS. 3 and 4 and a light source 57 for providing a light beam are mounted on both sides of the sensor substrate 52 in the sensor head 54 sandwiching the photosensitive device array 56. A state detector 58 for detecting the assembled state of the scale 50 and sensor head 54 from the light spot position detected at the light spot position sensor 2 is provided to configure a state detection system. The light beam from the light source 57 enters the scale 50 at a tilt and the light beam reflected from the scale 50 enters the position sensor 2. In this case, the scale gratings 51 may be formed on the side portion of the scale 50, to which the light beam from the light source 57 enters and alight reflected from the grating surface enters the position sensor 2. Alternatively, if the scale gratings 51 are not formed on the side portion, a reflective film may be formed continuously along the length of the scale 50 instead of the scale gratings 51.

If only a one-dimensional variation in the light spot position is required to detect, the position sensor 1 as described in FIGS. 1 and 2 may be employed.

Figure 10:
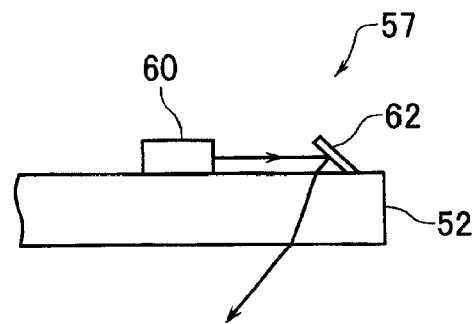
FIG. 10 shows an arrangement of a light source 57 for position detection in FIG. 9.

The light source 57 may be configured as shown in FIG. 10. In this example, a laser diode 60 is located on the sensor substrate 52 to output a light beam laterally. The output light beam is reflected at a mirror 62 then passes through the sensor substrate 52 and enters the scale 50 at a tilt. The mirror 62 can be formed easily with the recent micromachining technology.

Figure 11:
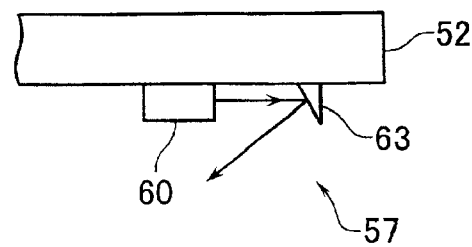
FIG. 11 shows another arrangement of a light source 57 for position detection in FIG. 9.

FIG. 11 shows another arrangement of the light source 57. In this example, a laser diode 60 is located on a surface of a sensor substrate 52 facing to the scale. The light beam output laterally from the laser diode 60 is reflected at a mirror 63 and enters the scale 50 at a tilt. The mirror 63 may have a reflective surface of concave mirror type to serve also as a lens.

Figure 12:
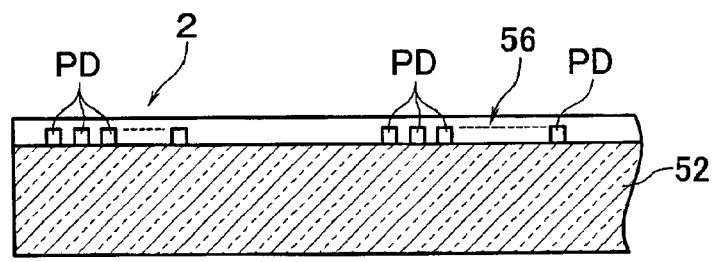
FIG. 12 shows an arrangement of a position sensor 2 in FIG. 9.
Figure 13:
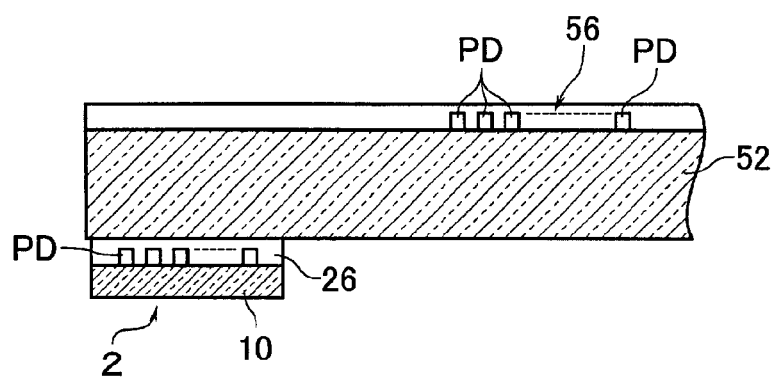
FIG. 13 shows an arrangement of a position sensor 2 in FIG. 9.

The light spot position sensor 2 may be formed simultaneously with the photosensitive device array 56, as shown in FIG. 12, using the sensor substrate 52 as the substrate 1 of FIG. 3 as such. Alternatively, as shown in FIG. 13, the position sensor 2, which is formed independent of the index substrate as described in FIGS. 3 and 4, may be adhered on the index substrate 52.

Figures 14A, 14B:
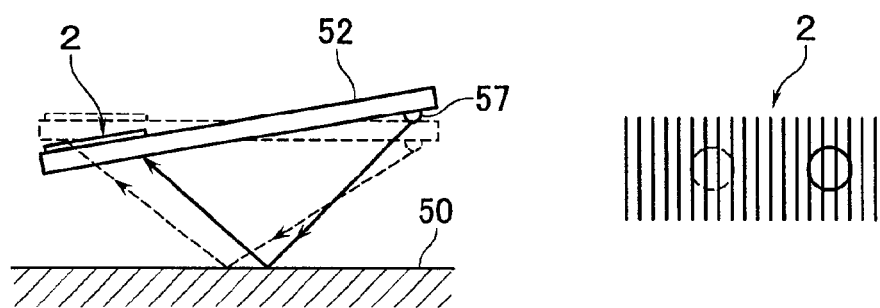
FIGS. 14A and 14B illustrate the principle of tilt detection by the position sensor.

Thus, the assembled state of the optical encoder can be detected by the position sensor 2 and light source 57 mounted on the sensor substrate 52. For example, FIG. 14A shows a normal state (dotted line) of the sensor substrate 52 that is arranged in parallel with the scale 50 and a tilted state (continuous line) of the sensor substrate 52 that is arranged at a tilt. The normal state differs from the tilted state in an incident position of a light beam into the position sensor 2 from the light source 57 as shown in FIG. 14B. Accordingly, a degree of the tilt of the sensor head can be determined by detecting the light spot position.

FIG. 15 shows a variable air gap between the sensor head and the scale 50. For example, the gap depicted with a dotted line in FIG. 15A is assumed in a normal state. If the gap reduces as depicted with a continuous line, an incident position of a light spot into the position sensor 2 varies as shown in FIG. 15B. Accordingly, detection of the light spot position can determine a magnitude of the gap between the sensor head and the scale.

A light source for providing a plurality of light beams in different directions and a plurality of light spot position sensors may be mounted on the sensor head. FIG. 16 shows such an example. Light spot position sensors 2a and 2b are located at both corners on edges of one diagonal line on a sensor substrate 52. A light source 57 capable of providing light beams to these light spot position sensors 2a and 2b is located at the remaining one corner. This arrangement allows for detection of tilts of the sensor head in the direction of the measurement axis and also in the direction normal to the measurement axis.

Figure 17A:
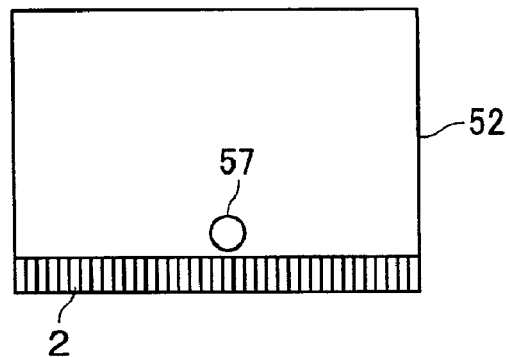
FIGS. 17A and 17B illustrate an arrangement of an index substrate in an optical encoder according to a further embodiment and the principle of tilt detection thereof.

In the above embodiments, the light beam from the light source 57 enters the scale 50 at a tilt and the reflected light beam therefrom is detected at the position sensor 2. In another arrangement, the light from the light source 57 may enter the scale 50 at a right angle. FIG. 17 shows such an arrangement. A light spot position sensor 2 is located along one side of a sensor substrate 52 in the sensor head. In addition, a light source 57 is located near the center of the position sensor 2.

Figure 17B:
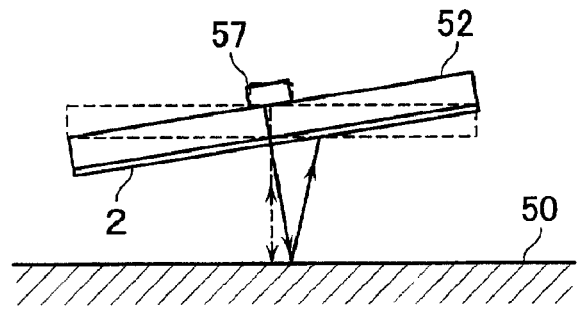

In the above arrangement, if the sensor substrate 52 is parallel with the scale 50 as depicted with a dotted line in FIG. 17B, the light beam from the light source 57 enters the scale 50 substantially at right angle and the light reflected therefrom returns along the same path. When the scale 50 tilts as depicted with a continuous line, the light beam enters the scale 50 at a tilt and shifts the position of the spot that enters the position sensor 2. Therefore, the tilt of the sensor head can be determined by detecting this positional deviation.

In the optical encoder exemplified above, detection of a state such as a tilt and gap of the sensor head to the scale is described. An example of the state detection by the light spot position sensor includes detection of a rotation of the sensor head in a plane parallel with the scale. The sensor head generally slides on sides of the scale via bearings. If the sides have poor linearity, the sensor head rotates when it slides and this rotation reduces the sensor output. In the present invention, the above rotation generates interference fringes on the light spot position sensor. Observing an output level of or a pitch in the interference fringes, the rotation can be detected. In this case, in order to determine whether the rotation occurs clockwise or counterclockwise, it is required to enter the light spot that is previously rotated a certain angle clockwise or counterclockwise to the scale.

As described above, mounting the optical state detection system on the optical encoder to detect the assembled state, attitude and gap variations can be checked easily. In addition, using the result from the state detection, a feedback control system can be configured to execute an attitude control in real time, for example. The light spot position sensor for use in the state detection system may be fabricated in the sensor substrate. Alternatively, it may be adhered on the sensor substrate if it is made separately and independently as shown in FIG. 13. If the light spot position sensor is adhered an the sensor substrate already prepared, flexible applications to produce encoders in a low quantity and wide variety can be achieved advantageously. A production temperature is relatively lower than a temperature for use in processing a Si substrate. Thus, the light spot position sensor of the present invention may be integrated directly into a Si substrate (sensor substrate) that includes-a sensor already produced or into a usual IC.

The state detection system can be integrated into an optical encoder of transmissible type in the same manner. The light spot position sensor and light source both included in the state detection system can be located on the photo-receptive side of the sensor head or on the same side of the scale. In this case, it is required to form a reflective film on a transmissible scale in order to detect a light spot position.

Examples of detection of the assembled state such as the attitude and gap of the sensor head are described above. The same light spot position sensor may be integrated into the sensor substrate for use in detecting an origin on the scale.

The optical encoder described above employs the main light source 53 to illuminate the scale for use in displacement detection and the light source 57 for the light spot position sensor. The light source 57 for the light spot position sensor provides a light beam like a laser diode does. Accordingly, it is easy to control the light source 57 so as not to badly affect on displacement detection. To the contrary, the main light source 53 for displacement detection provides an output light that extends to a certain range and enters the scale 50. Therefore, if the light reflected from the scale enters the light spot position sensor, it turns into a possible noise for displacement detection.

For elimination of the noise influence, it is preferable to provide any light shield structure that allows only the Light beam from the light source 57 to enter the light spot position sensor. Alternatively, it is effective that two light sources 53 and 67 have different wavelengths. In the latter case, it is required to combine optical filters with the photosensitive device array 56 for displacement detection and the photosensitive device array PDA for the light spot position sensor 2. Alternatively, they may be produced with individual semiconductor materials with different characteristics.

The above described noise influence can not be found in an application to a capacitive or magnetic encoder.

The present invention can be applied to a displacement detection instrument that is a linear encoder, rotary encoder, or cylindrical or spherical encoder.

Figure 18A:
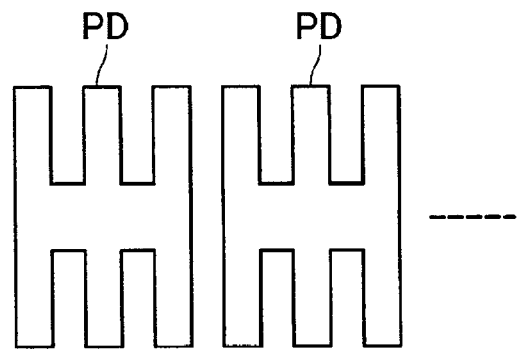
FIGS. 18A and 18B show other examples of photosensitive device patterns for use in the position sensor.
Figure 18B:
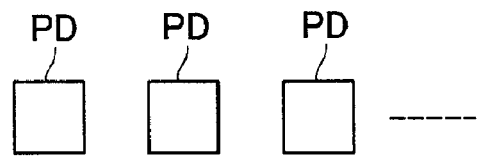

In the above embodiments, stripe-shaped photodiodes PD are employed as the photosensitive devices for the light spot position sensor, though an array of comb-patterned photodiodes PD as shown in FIG. 18A and an array of dot-patterned photodiodes PD as shown in FIG. 18B may also be employed.

The above-described light spot position sensor may be applied as a displacement measuring device to measurement of the surface roughness and contour of a work.

Currently known light-utilizing probe products mainly include a SPM (Scanning Probe Microscope), which detects a displacement of a probe using an optical lever. In the SPM, its light source and photosensitive detector (PSD) are located outside. Therefore, its device construction is complicated and relatively larger. In addition, it is fundamentally of contact type and accordingly has a possibility to impart a damage on a surface of the sample (work). In addition, since the probe is a physical stylus, its size (tip shape, length and so forth) limits objects to be measured.

The use of a non-contact cantilever that includes the light spot position sensor of the present invention mounted thereon can provide a non-contact, micro-pore measuring instrument and a non-contact, surface-roughness meter.

Figure 19A:
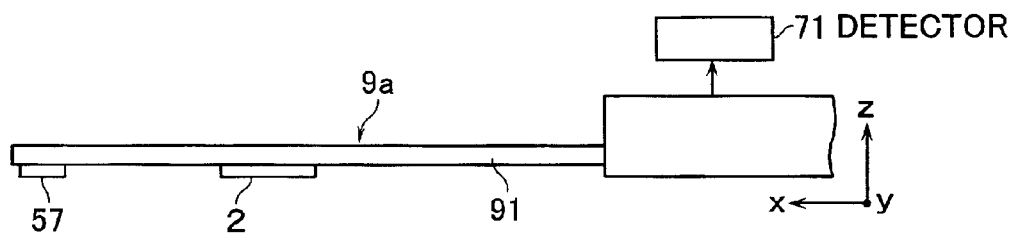
FIGS. 19A and 19B show a main part of a non-contact cantilever using a two-dimensional position sensor.
Figure 19B:
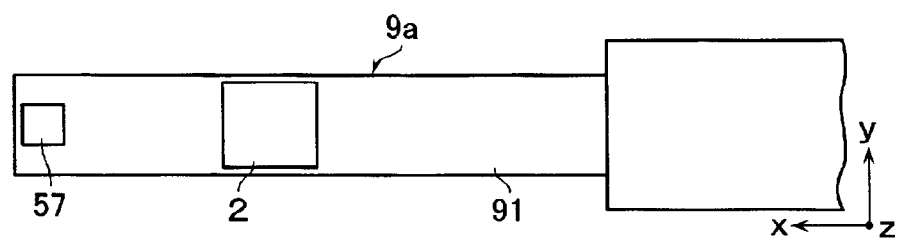
Figure 20A:
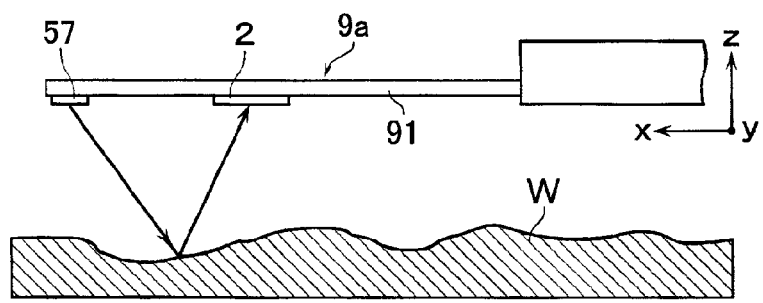
FIGS. 20A and 20B show states of the cantilever in use.
Figure 20B:
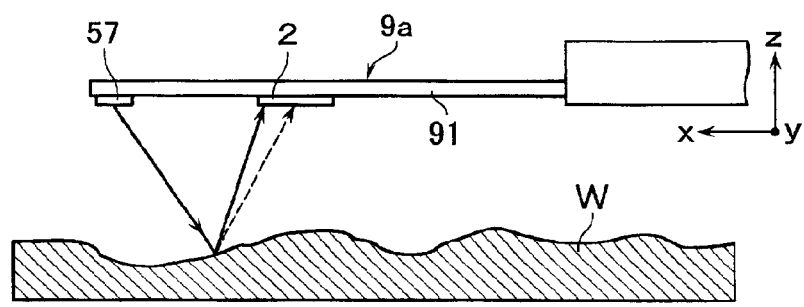
Figure 21A:
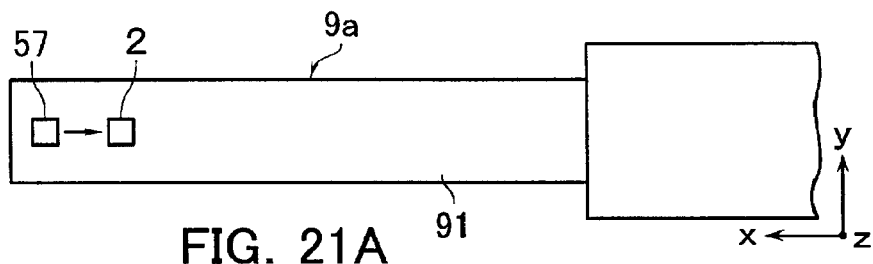
FIGS. 21A–21E show several examples of a positional relation of the position sensor to the light source.
Figure 21B:
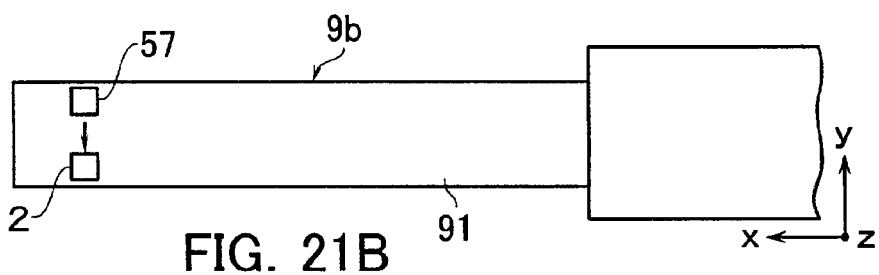
Figure 21C:
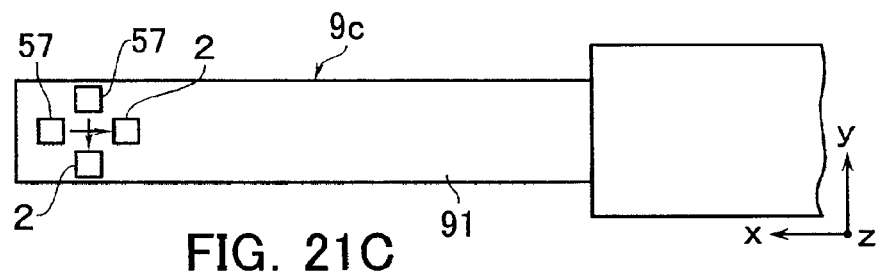
Figure 21D:
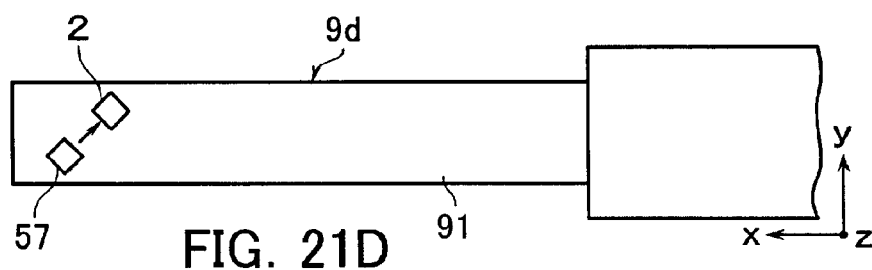
Figure 21E:
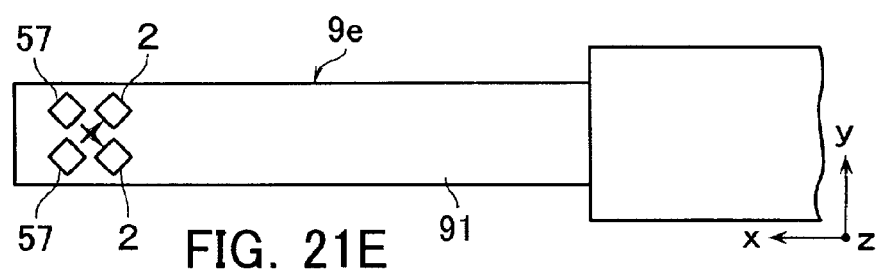

FIG. 19 shows the main part of a non-contact cantilever 9a that includes the two-dimensional position sensor 2 applied thereto. FIG. 20 shows states of the cantilever in use.

The cantilever includes a cantilever body 91, which is a member consisting of a material such as Si or Si nitride and extending along a measurement axis (x-axis in the figure). The two-dimensional position sensor 2 and the light source 57 that includes at least a laser diode are arrayed along the length of the cantilever body 91 apart a certain interval from each other near the tip of the lower surface.

When one of the cantilever body 91 and a work W is moved along measurement axis relative to the other, a detector 71 detects a contour and roughness of a surface to be measured in the work W from the light spot position detected at the two-dimensional position sensor 2.

FIG. 21 shows several examples of a positional relation of the position sensor 2 to the light source 57. FIG. 21A shows the non-contact cantilever 9a with the two-dimensional position sensor 2 and the light source 57 arrayed along the length as described above. FIG. 21B shows a non-contact cantilever 9b with the two-dimensional position sensor 2 and the light source 57 arrayed along the direction perpendicular to the length (y-axis in the figure). FIG. 21C shows a non-contact cantilever 9c with the two-dimensional position sensor 2 and the light source 57 located in a combined arrangement of FIGS. 21A–B. FIG. 21D shows a non-contact cantilever 9d with the light source 57 and the position sensor 2 rotated an arbitrary angle such as 45° in an x-y plane while holding the positional relation between them. FIG. 21E shows a non-contact cantilever 9e that has a combination of an arrangement of FIG. 21D with an arrangement crossing to the arrangement of FIG. 21D.

In the cantilevers 9a–9e, the positional relation between the position sensor 2 and the light source 57 may be reversed.

Figure 22A:
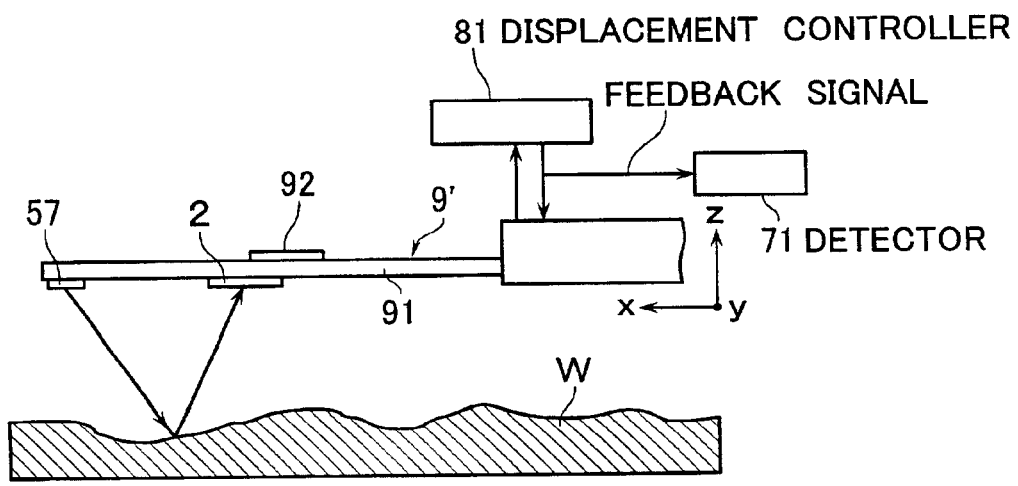
FIGS. 22A and 22B show a non-contact cantilever containing a displacement device formed therein.
Figure 22B:
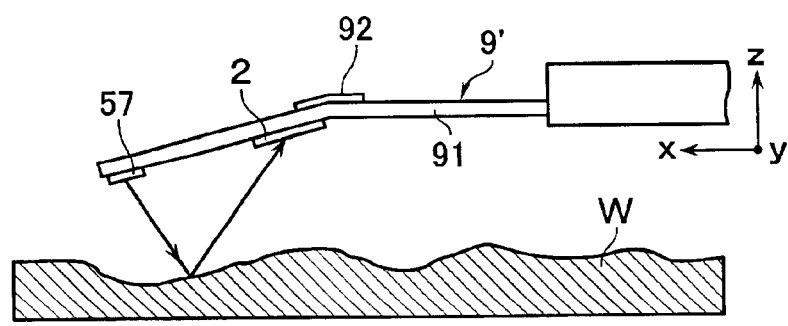

FIG. 22 shows a non-contact cantilever 9' that integrates a displacement device 92, which consists of bimetal or piezoelectric element to displace the tip of the cantilever body 91 in the direction normal to the work Wor in the torsion direction of the cantilever body 91. A displacement controller 81 performs a feedback control to hold a constant position to reflect for the light beam from the light source 57. The detector 71 detects a contour and roughness of a surface to be measured in the work W from the feedback signal. Also in this manner, the contour and surface roughness of the work can be measured. In addition, this can respond to measurement of the contour and roughness of the work surface with a larger shape variation.

Figure 23A:
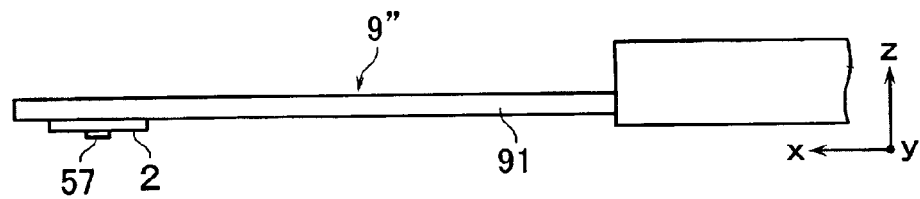
FIGS. 23A and 23B show a non-contact cantilever of vertical incident type.
Figure 23B:
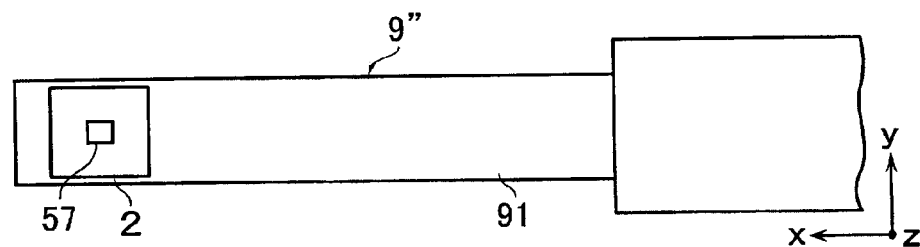
Figure 24A:
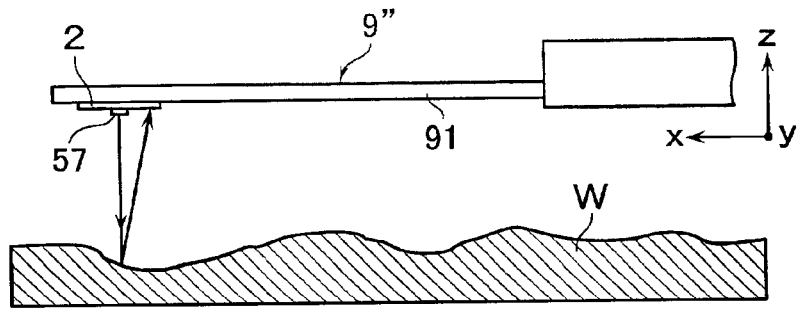
FIGS. 24A and 24B show states of the same cantilever in use.
Figure 24B:
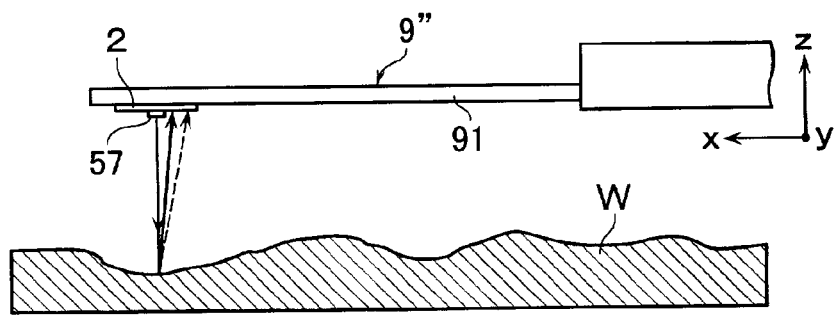

FIG. 23 shows non-contact cantilever 9'' of vertical incident type and FIG. 24 shows states of the cantilever in use. In the non-contact cantilever 9'', the light source 57 is located at the center of the position sensor 2 that is arranged on the lower surface of the cantilever body 91. The light beam from the light source 57 enters the work surface vertically. The position sensor 2 detects the light spot reflected from the work surface after emitted from the light source 57.

Similar to the above non-contact cantilevers 9a–9e also in this embodiment, the shape variation of the work surface varies the reflected position of the light beam and the shape of the light spot responsively. Detection of the above makes it possible to measure the contour and roughness of the work surface. In the embodiment shown in FIG. 23, the position sensor is integral and relatively larger. Besides, a plurality of position sensors can be located arbitrary positions.

In all the non-contact cantilevers descried above, the position sensor and the light source can be arranged in the following four manners:

(1) The position sensor and the light source are both arranged on the cantilever body in a surface opposite to the work;

(2) The position sensor is arranged on the cantilever body in a surface opposite to the work and the light source on the cantilever body in a surface not opposite to the work;

(3) The light source is arranged on the cantilever body in a surface opposite to the work and the position sensor on the cantilever body in a surface not opposite to the work; and (4) The position sensor and the light source are both arranged on the cantilever body in a surface not opposite to the work.

Thus, the above-descried non-contact cantilevers can achieve measurement of a surface roughness and contour in a microstructure such as an inner surface on a micro-hole that has been difficult to measure in the art. Also in this embodiment, the two-dimensional position sensor is composed of amorphous Si and the like with a lower cost and a smaller size than the sensor with CCD and the like. Further, the downsizing of the sensor hardly causes a crosstalk.

Further in the embodiment, since the position sensor and the light source are fabricated in the cantilever body, no external light source and PSD is required. In addition, since this embodiment can freely design the position sensor and others, it can provide a non-contact cantilever that is downsized in accordance with a measurement accuracy and range. The non-contact cantilever according to the embodiment does not require a physical probe and accordingly does not receive restrictions from the tip shape and the length of the probe. Therefore, it can measure a small hole with an inner diameter slightly larger than an outer diameter of the cantilever body.

The non-contact cantilever according to the embodiment can measure a roughness and contour on a part in the work surface, to which the light beam from the light source impinged. That is, it can measure coordinates in a vertical plane that contains the measurement axis. It can further get tilt information at the light beam-impinged part.

In accordance with measured data obtained from the above non-contact cantilever, for example, during producing a solid model and the like on the basis of three-dimensional data on the work surface measured, an interpolation accuracy of measured data between measured points can be improved.

If only one-dimensional position information that does not include tilt information, such as roughness and contour, is detected, the position sensor 1 as shown in FIGS. 1 and 2 can be employed instead of the position sensor 2.

As obvious from the forgoing, the light spot position sensor according to the present invention comprises an array of photosensitive devices isolated from each other and formed from semiconductor layers deposited on an appropriate substrate. Therefore, its structure and manufacturing process is simple and an arbitrary shaped and sized position sensor can be manufactured easily.

In addition, the displacement measuring device according to the present invention integrates an optical state detection system using the light spot position sensor therein. Therefore, it can simply determine an assembled state of a sensor head and scale.

Having described the embodiments consistent with the invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. A displacement measuring device, comprising:

a scale having scale markings formed along a measurement axis;

a sensor head movably arranged relative to said scale along said measurement axis for reading said scale markings; and a state detection system mounted on said sensor head for optically detecting at least one of a tilt and a gap between said sensor head and said scale, wherein said state detection system contains a light spot position sensor including a substrate; and a plurality of photosensitive devices arrayed at a certain pitch, formed with semiconductor layers deposited on said substrate, and isolated from each other.

2. The displacement measuring device according to claim 1, wherein said plurality of photosensitive devices configures a photosensitive device array arranged one-dimensionally.

3. The displacement measuring device according to claim 1, wherein said plurality of photosensitive devices includes a first photosensitive device array arranged on said substrate along a first axis; and a second photosensitive device array arranged on said first photosensitive device array with an interlayer insulator therebetween, along a second axis different from said first axis.

4. The displacement measuring device according to claim 1, further comprising a scanning detector for sequentially scanning output signals from said plurality of photosensitive devices to detect a light spot position.

5. The displacement measuring device according to claim 1, further comprising:

an output signal line commonly connected to terminal electrodes of said plurality of photosensitive devices; and a detection circuit connected to said output signal line, wherein a light spot is radiated as a light pulse to determine a light spot position from a delay time of a detection output from said detection circuit after said light pulse irradiation.

6. The displacement measuring device according to claim 1, wherein said state detection system further includes a light source arranged on said sensor head for providing a light beam entering said light spot position sensor via said scale.

7. The displacement measuring device according to claim 6, wherein said light spot position sensor detects rotations in a parallel plane between said sensor head and said scale based on detection of interference fringes.

8. The displacement measuring device according to claim 1, wherein said state detection system further includes a state detection means for detecting at least one of the tilt, the gap and an original position of said sensor head to said scale based on a light spot position detected at said light spot position sensor.

* * * * *